No. 746,810. PATENTED DEC. 15, 1903.
W. FODEN.
METALLIC PACKING FOR PISTON RODS.
APPLICATION FILED FEB. 25, 1903.
NO MODEL.
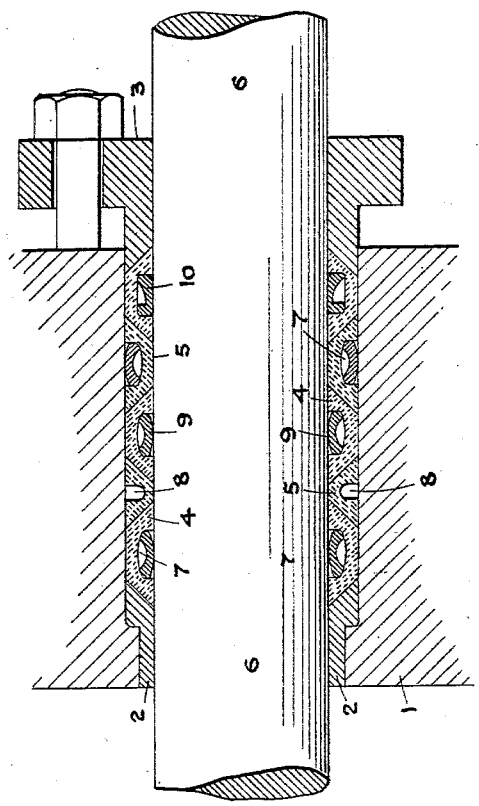
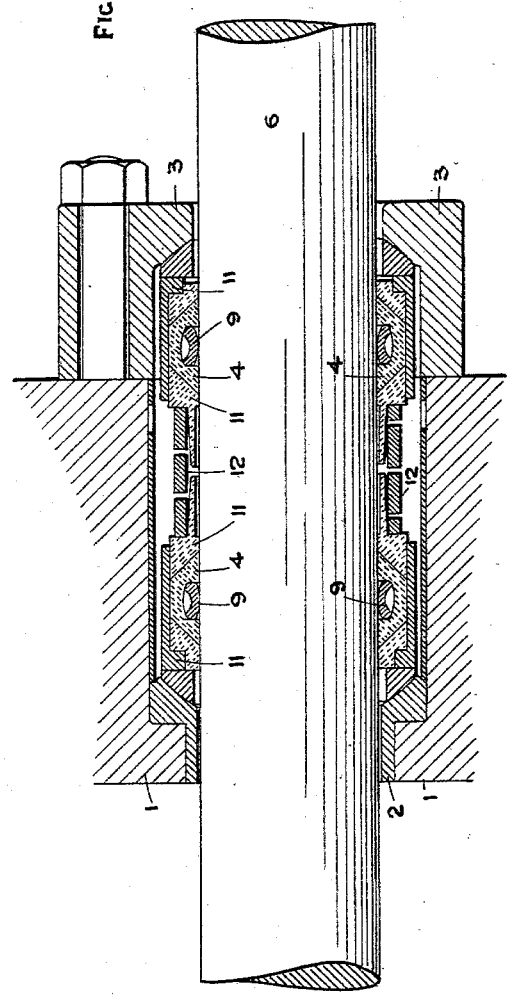

No. 746,810. Patented December 15, 1903.

UNITED STATES PATENT OFFICE.

WILLIAM FODEN, OF ROCK FERRY, ENGLAND, ASSIGNOR TO THE UNITED KINGDOM SELF-ADJUSTING ANTI-FRICTION METALLIC PACKING SYNDICATE, LIMITED, OF LIVERPOOL, ENGLAND.

METALLIC PACKING FOR PISTON-RODS.

SPECIFICATION forming part of Letters Patent No. 746,810, dated December 15, 1903.

Application filed February 25, 1903. Serial No. 145,036. (No model.)

*To all whom it may concern:*

Be it known that I, WILLIAM FODEN, a subject of the King of Great Britain, residing in Rock Ferry, in the county of Chester, England, have invented certain new and useful Improvements in Metallic Packing for Piston-Rods and the Like, of which the following is a specification.

In metallic packing as commonly made the packing-rings are cut at one or more places to allow the rings to close on the rod by relative movement of the ends as the rubbing-surfaces wear away. As the continuity of the ring is thus broken, various devices are used to prevent or minimize leakage at the gaps or joints, and the rings are always arranged in the stuffing-box so as to break joint. Notwithstanding this the fluid often passes the joints ring by ring, causing the packing to blow, this being more especially so in the case of liquids.

The object of the present invention is to obviate this defect by so modifying the cross-sectional form of the rings that the necessary radial adaptation to compensate for wear is obtained without the necessity for any gaps or joints in the rings, so that the latter can be made continuous where the form of the rod permits, and in cases where the rings have to be made in parts in order to be fitted on a rod with swelled ends the adjacent ends of the parts can be mechanically fitted and butted close together, so as to be fluid-tight.

I have illustrated my invention in the accompanying drawings, in which—

Figure I is a longitudinal section showing a solid form of packing constructed according to this invention, and Fig. II a longitudinal section through a stuffing-box fitted with a floating packing.

The stuffing-box 1 is provided with the usual neck-bush 2 and gland 3, between which are located the packing-rings 4 5. The cross-section of the rings is an isosceles triangle with the vertex cut off by a line parallel to the base which is perpendicular to the plane of the ring. The rings are of two kinds—"inside" rings 4, with the base of the cross-sectional triangle lying on the inside of the ring next the rod 6, and "outside" rings 5, with the base of the triangle against the inside of the walls of the stuffing-box 1. A considerable portion of the section is cut away by turning or boring, as the case may be, grooves or recesses 7 8 on the side of the ring, which forms the base in the triangular section. In conjunction with the main rings auxiliary rings 9 10 are or may be used. The rings 9 are of bowed cross-section, and they fit within the recesses 7, the convexity being turned toward the base of the triangle and the chord parallel thereto, the ends of the lune or bowed section abutting against the sides of the recess. Fig. I shows a series of these inside and outside rings arranged alternately in a stuffing-box and confined between the neck-bush 2 and the gland 3. It will be seen that on screwing up the gland 3 axial pressure is applied and transmitted from ring to ring through the abutting oblique faces, which accurately agree. The effect of this will be to cause the rings to spring at the bottom of the recesses 7 and 8, where the metal is comparatively thin, so increasing the radial width of the rings and giving the necessary radial pressure inwardly against the rod 6 and outwardly against the walls of the stuffing-box 1 to compensate for the effect of wear. The closing up of the sides of the recesses 7 produces a similar result in the case of the auxiliary rings 9 10, increasing their curvature and forcing their convex surfaces against the side of the rod 6 or stuffing-box 1, as the case may be.

Instead of making the auxiliary rings of bow cross-section 9 I may form them of more or less rectangular cross-section, which may also be recessed in the manner previously described or as shown at 10, Fig. I, or the main rings may be grooved and used alone without auxiliary rings, as shown at 8. The rings are made of any suitable metal or alloy, as white-metal, bronze, brass, or the like.

In the case of a floating packing, as shown in Fig. II, one or more rings 4 are arranged in casings 11 free to move laterally by a limited amount in the stuffing-box, and the necessary axial pressure is exerted by or transmitted through a spring 12 after the manner common to such arrangements.

Having now fully described my invention, what I claim, and desire to secure by Letters Patent, is—

1. In combination with a rod, a stuffing-box and a gland; a series of packing-rings having beveled sides the bases of the rings facing in opposite directions and recesses in the said oppositely-facing bases, substantially as described.

2. In combination with a rod, a stuffing-box and a gland; a series of packing-rings having beveled sides the bases of the rings facing in opposite directions, recesses in the said oppositely-facing bases and a series of rings located in the said recesses.

3. In combination with a rod, a stuffing-box and a gland; a series of packing-rings having beveled sides the bases of the said rings facing in opposite directions, recesses in the said oppositely-facing bases and a series of rings of substantially similar shape located in an inverted position in the said recesses, substantially as described.

4. In combination with the rod, the stuffing-box and the gland, rings having beveled sides and an internal recess, and a spring to provide axial pressure; substantially as described.

5. In combination with the rod, the stuffing-box and the gland; a pair of sleeves, rings having beveled sides and an internal recess, located within the said sleeves, and an interposed spring to provide axial pressure; substantially as described.

6. In combination, the rod, the stuffing-box, the gland, the sleeves, the beveled recessed rings within the sleeves, the beveled recessed rings located in an inverted position within the recesses of the said rings, and an interposed spring forcing the sleeves against their end bearings by pressure transmitted through the rings; substantially as described.

In testimony whereof I have hereunto set my hand in the presence of two subscribing witnesses.

WILLIAM FODEN.

Witnesses:
J. E. LLOYD BARNES,
JOSEPH E. HIRST.